(12) United States Patent
Choe et al.

(10) Patent No.: US 12,228,777 B2
(45) Date of Patent: Feb. 18, 2025

(54) OPTICAL ALIGNMENT DEVICE

(71) Applicant: ELECTRONICS AND TELECOMMUNICATIONS RESEARCH INSTITUTE, Daejeon (KR)

(72) Inventors: Joong-Seon Choe, Daejeon (KR); Duk Jun Kim, Daejeon (KR); Chun Ju Youn, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 290 days.

(21) Appl. No.: 18/079,973

(22) Filed: Dec. 13, 2022

(65) Prior Publication Data
US 2023/0258885 A1    Aug. 17, 2023

(30) Foreign Application Priority Data
Feb. 14, 2022    (KR) .................. 10-2022-0018619

(51) Int. Cl.
*G02B 6/42*    (2006.01)
(52) U.S. Cl.
CPC ........... *G02B 6/423* (2013.01); *G02B 6/4202* (2013.01); *G02B 6/4243* (2013.01)
(58) Field of Classification Search
CPC ........................................ G02B 6/4221–4227
See application file for complete search history.

(56) References Cited

U.S. PATENT DOCUMENTS

| 8,079,125 B2 * | 12/2011 | Ban ..................... G02B 6/4246 |
| | | 385/94 |
| 9,400,358 B2 * | 7/2016 | Chen ................... G02B 6/4226 |
| 9,423,569 B2 * | 8/2016 | Son ..................... G02B 6/3616 |

(Continued)

FOREIGN PATENT DOCUMENTS

| JP | 04-309907 A | 11/1992 |
| JP | 2590715 B2 | 3/1997 |

(Continued)

OTHER PUBLICATIONS

K. Matsuda et al., "A Surface-Emitting Laser Array with Backside Guiding Holes for Passive Alignment to Parallel Optical Fibers", IEEE Photonics Technology Letters, vol. 8, No. 4, Apr. 1996.

*Primary Examiner* — Rhonda S Peace
(74) *Attorney, Agent, or Firm* — LRK PATENT LAW FIRM

(57) ABSTRACT

An optical alignment device according to an embodiment of the inventive concept includes an optical alignment plate having a first hole and at least one second hole, in which the first hole and the second hole pass through the optical alignment plate, and an optical detection element disposed on the optical alignment plate. Here, the optical detection element includes a substrate having a first surface and a second surface, which face each other, a lens disposed on the first surface, and an optical sensor disposed on the second surface, and the optical detection element vertically overlaps the first hole and the second hole. The lens is exposed to the outside by the first hole, and the second hole is connected with a vacuum suction unit to fix the optical detection element to the optical alignment plate.

14 Claims, 8 Drawing Sheets

(56) References Cited

U.S. PATENT DOCUMENTS

| | | | |
|---|---|---|---|
| 9,715,071 B1* | 7/2017 | Kim | G02B 6/4206 |
| 9,934,936 B2* | 4/2018 | Potocek | H01J 37/263 |
| 10,737,507 B2* | 8/2020 | Iljima | G02B 19/0061 |
| 2009/0092362 A1 | 4/2009 | Mizue et al. | |
| 2009/0297099 A1* | 12/2009 | Benjamin | G02B 6/4257 |
| | | | 385/32 |
| 2013/0088714 A1* | 4/2013 | Terada | H01L 21/68757 |
| | | | 356/244 |
| 2014/0270631 A1* | 9/2014 | Choraku | G02B 6/4221 |
| | | | 29/407.04 |
| 2014/0290850 A1* | 10/2014 | Yamakami | G02B 6/4239 |
| | | | 156/362 |
| 2014/0332672 A1* | 11/2014 | Sheu | G02B 6/426 |
| | | | 250/216 |
| 2020/0183109 A1 | 6/2020 | Peterson et al. | |
| 2021/0234615 A1 | 7/2021 | Han et al. | |
| 2021/0255385 A1 | 8/2021 | Choe et al. | |
| 2023/0258885 A1* | 8/2023 | Choe | G02B 6/4234 |
| | | | 385/52 |

FOREIGN PATENT DOCUMENTS

| | | |
|---|---|---|
| JP | 2009-109992 A | 5/2009 |
| JP | 2013-61441 A | 4/2013 |
| KR | 10-2008-0017283 A | 2/2008 |
| KR | 10-1502318 B1 | 3/2015 |
| KR | 10-2021-0115902 A | 9/2021 |

* cited by examiner

OPTICAL ALIGNMENT DEVICE

CROSS-REFERENCE TO RELATED APPLICATION(S)

This U.S. non-provisional patent application claims priority under 35 U.S.C. § 119 of Korean Patent Application No. 10-2022-0018619, filed on Feb. 14, 2022, the entire contents of which are hereby incorporated by reference.

BACKGROUND

1. Field of the Invention

The present disclosure herein relates to an optical alignment device for achieving optical alignment between an optical detection element and an optical fiber.

2. Description of Related Art

An optical detection element represents an element that receives an optical signal and generates an electrical signal. Among the optical detection elements, some optical detection elements such as a surface-illuminated photodetector use all of a front surface and a rear surface thereof in such a manner that an optical signal is incident to the rear surface by integrating a micro-lens to a bottom of the optical detection element to improve an optical adsorption efficiency, and an optical current is output through an electrode disposed on the front surface of the optical detection element.

In order to observe operation characteristics of the optical detection element that uses all of the front surface and the rear surface, optical alignment between the optical detection element and an optical fiber at the rear surface is required. Particularly, researches on technology, in which optical alignment is easily performed on a water before the optical detection element is packaged, and the operation characteristics of the optical detection element is easily observed, are being actively performed.

SUMMARY

The present disclosure provides an optical alignment device for smoothly achieving optical alignment between an optical detection element and an optical fiber.

An embodiment of the inventive concept provides an optical alignment device including: an optical alignment plate having a first hole and at least one second hole, wherein the first hole and the second hole pass through the optical alignment plate; and an optical detection element disposed on the optical alignment plate. Here, the optical detection element includes a semiconductor substrate having a first surface and a second surface, which face each other, a lens disposed on the first surface, and an optical sensor disposed on the second surface, the optical detection element vertically overlaps the first hole and the second hole, the lens is exposed to the outside by the first hole, and the second hole is connected with a vacuum suction unit to fix the optical detection element to the optical alignment plate.

In an embodiment, the first hole may have a rectangular shape, and the lens may have a downward convex shape.

In an embodiment, the optical sensor may include a p-type semiconductor layer and an n-type semiconductor layer, which are vertically spaced apart from each other, with an i-type (intrinsic) semiconductor layer disposed therebetween.

In an embodiment, the optical alignment device may further include a jig disposed below the optical alignment plate and an optical fiber fixed to the jig, and one end of the optical fiber may be disposed adjacent to the lens.

In an embodiment, the jig may have an optical fiber insertion groove, and as the optical fiber is inserted to the optical fiber insertion groove, the one end of the optical fiber may vertically extend toward the lens.

In an embodiment, the optical alignment device may further include a first microscope disposed above the optical detection element and a second microscope disposed below the jig, and the second microscope may vertically overlap the lens.

In an embodiment, the second hole may be provided in plurality, some of the second holes may be disposed at one side of the first hole, and the rest of the second holes may be disposed at the other side of the first hole with the first hole therebetween.

In an embodiment, the lens may have a diameter less than that of the first hole.

In an embodiment of the inventive concept, an optical alignment device includes: an optical detection element including a lens and an optical sensor disposed on the lens; an optical alignment plate disposed below the optical detection element and having a first hole; a jig disposed below the optical alignment plate and having an optical fiber insertion groove; and an optical fiber inserted to the optical fiber insertion groove. Here, the optical detection element covers the first hole, the lens is exposed to the outside by the first hole, and the optical sensor includes a p-type semiconductor layer and an n-type semiconductor layer, which are vertically spaced apart from each other, with an i-type (intrinsic) semiconductor layer disposed therebetween. Also, one end of the optical fiber vertically extends toward the lens.

In an embodiment, the optical alignment plate may further have at least two second holes, the two second holes may be spaced apart from each other with the first hole therebetween, and the optical detection element may cover the second holes.

In an embodiment, the second holes may be connected with a vacuum suction unit to fix the optical detection element to the optical alignment plate.

In an embodiment, the optical alignment device may further include a first microscope disposed above the optical detection element to vertically overlap the optical detection element.

In an embodiment, the optical alignment device may further include: a reflection mirror disposed below the jig; and a second microscope disposed adjacent to a side surface of the reflection mirror.

In an embodiment of the inventive concept, an optical alignment device includes: an optical alignment plate having a first hole and at least one second hole disposed around the first hole; an optical detection element disposed on the optical alignment plate, in which the optical detection element includes a lens and an optical sensor disposed on the lens; a jig disposed below the optical alignment plate and having an optical fiber insertion groove; and a microscope disposed below the jig. Here, the optical detection element covers all of the first hole and the second hole, the lens is exposed to the outside by the first hole, an optical fiber is inserted to the optical fiber insertion groove, so that one end of the optical fiber vertically overlaps the lens, and the microscope observes an alignment state between the lens and the one end of the optical fiber.

BRIEF DESCRIPTION OF THE DRAWINGS

The accompanying drawings are included to provide a further understanding of the inventive concept, and are

DETAILED DESCRIPTION

Figure 1:
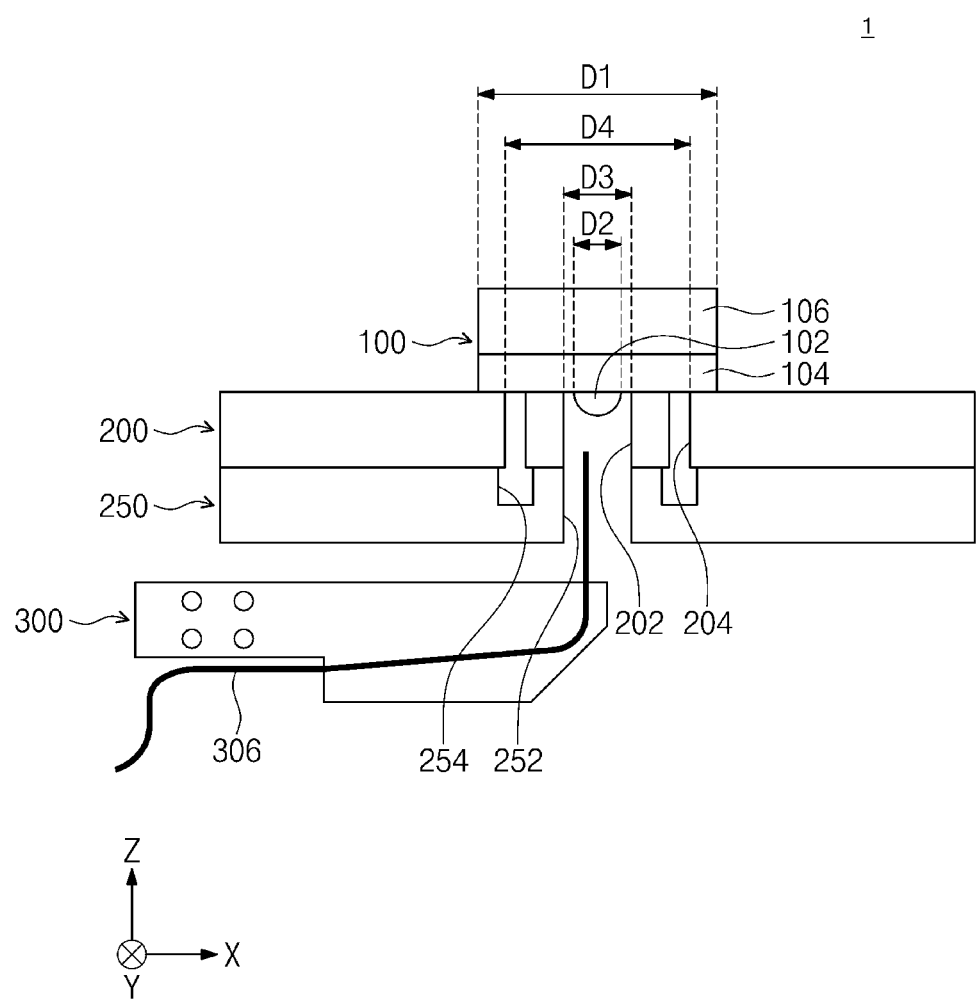
FIG. 1 is a view illustrating an optical alignment device according to an embodiment of the inventive concept.

Advantages and features of the present invention, and implementation methods thereof will be clarified through following embodiments described with reference to the accompanying drawings. The present invention may, however, be embodied in many different forms and should not be construed as being limited to the embodiments set forth herein. Rather, these embodiments are provided so that this disclosure will be thorough and complete, and will fully convey the concept of the invention to those skilled in the art. Further, the present invention is only defined by scopes of claims. Like reference numerals refer to like elements throughout.

In the following description, the technical terms are used only for explaining a specific exemplary embodiment while not limiting the present invention. The terms of a singular form may include plural forms unless referred to the contrary. The meaning of "include," "comprise," "including," or "comprising," specifies a property, a region, a fixed number, a step, a process, an element and/or a component but does not exclude other properties, regions, fixed numbers, steps, processes, elements and/or components.

Additionally, the embodiment in the detailed description will be described with sectional views as ideal exemplary views of the present invention. In the figures, the dimensions of layers and regions are exaggerated for clarity of illustration. Accordingly, shapes of the exemplary views may be modified according to manufacturing techniques and/or allowable errors. Therefore, the embodiments of the present invention are not limited to the specific shape illustrated in the exemplary views, but may include other shapes that may be created according to manufacturing processes. For example, an etched region having a right angle illustrated in the drawings may have a round shape or a shape having a predetermined curvature. Areas exemplified in the drawings have general properties, and are used to illustrate a specific shape of a semiconductor package region. Thus, this should not be construed as limited to the scope of the present invention.

Hereinafter, an optical alignment device according to an embodiment of the inventive concept will be described in detail with reference to the accompanying drawings.

Figure 2:
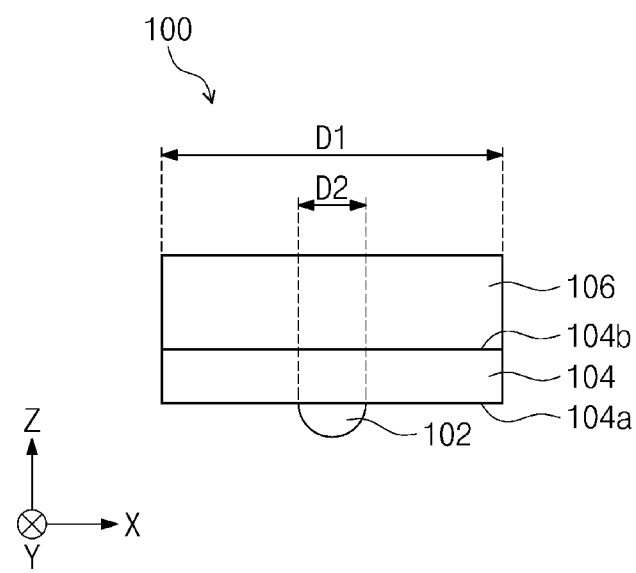
FIG. 2 is a cross-sectional view illustrating an optical detection element of FIG. 1.
Figure 3:
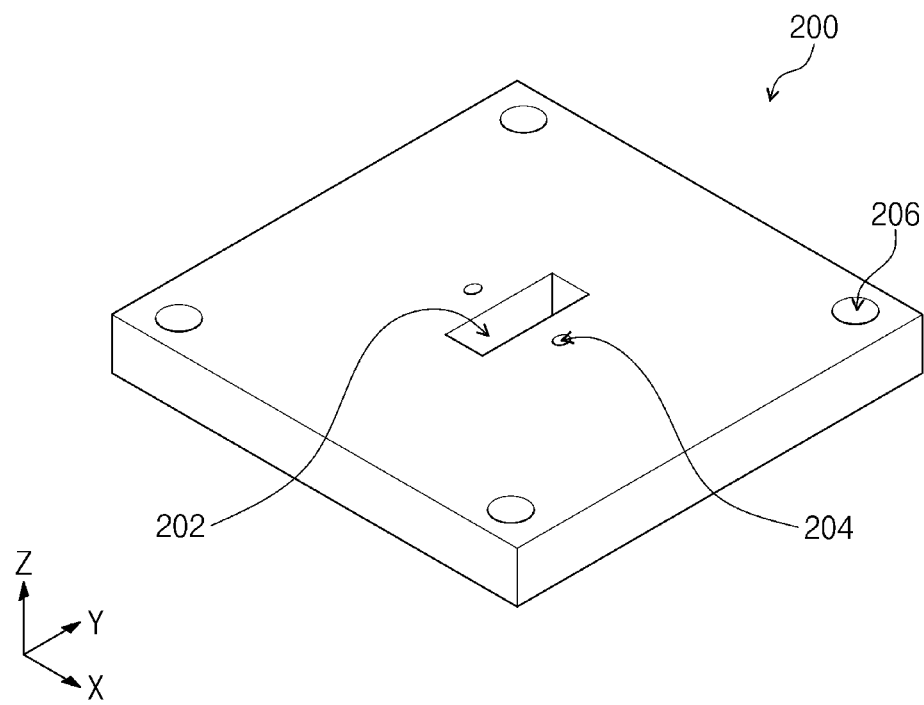
FIG. 3 is a perspective view illustrating an optical alignment plate of FIG. 1.
Figure 4:
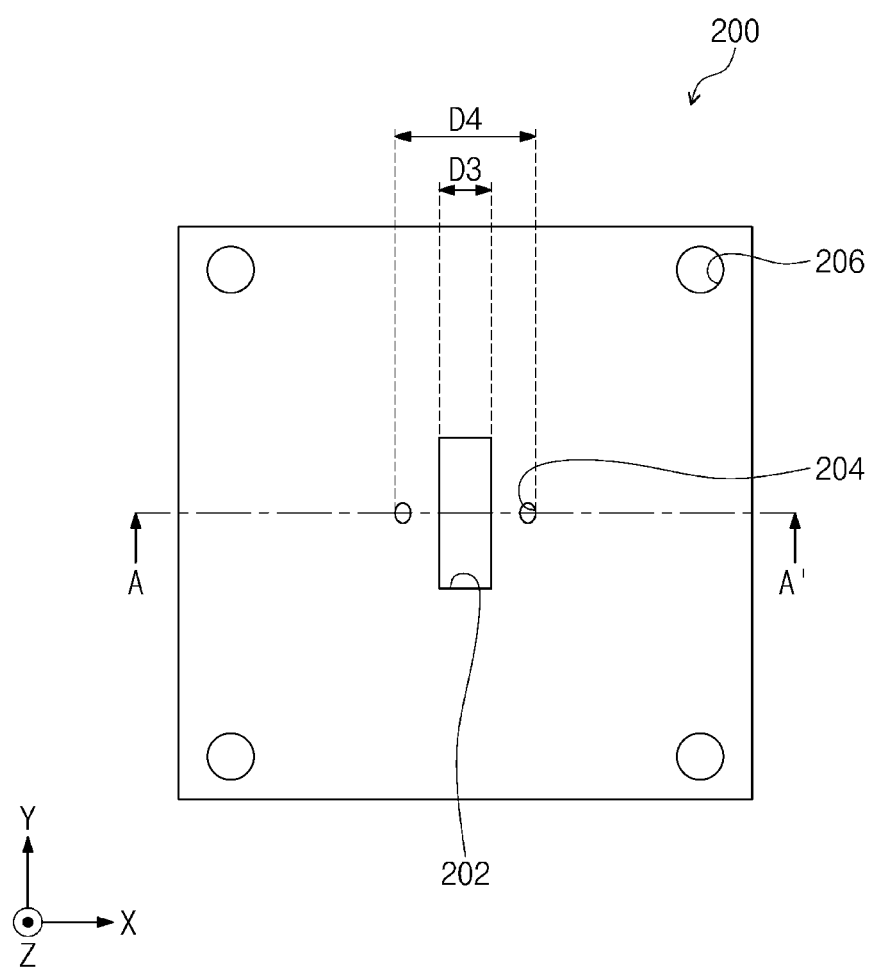
FIG. 4 is a plan view illustrating a top surface of the optical alignment plate of FIG. 1.
Figure 5:
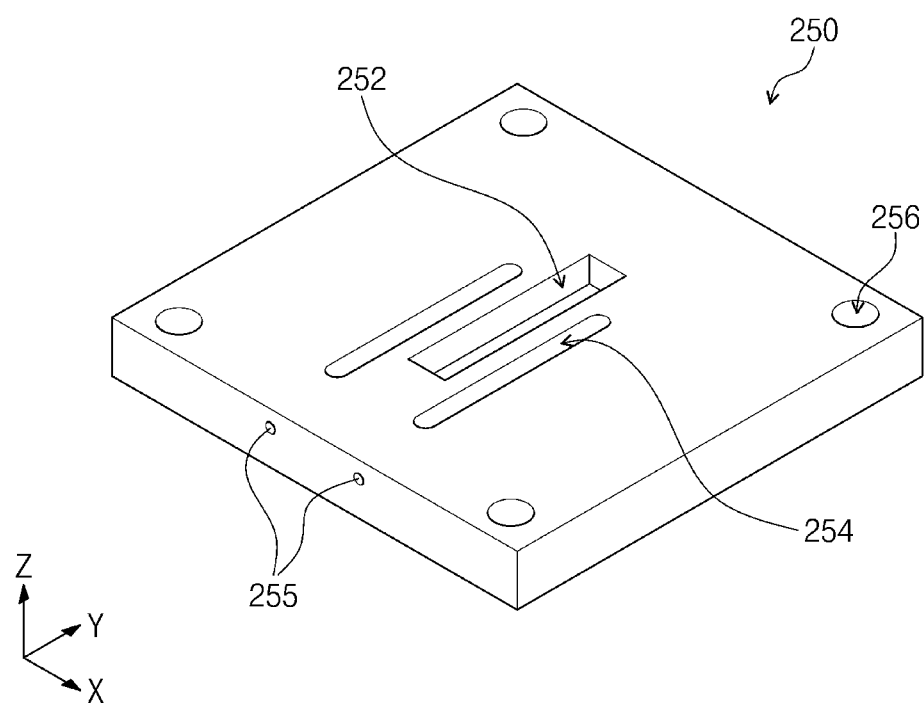
FIG. 5 is a perspective view illustrating a fixing plate of FIG. 1.
Figure 6:
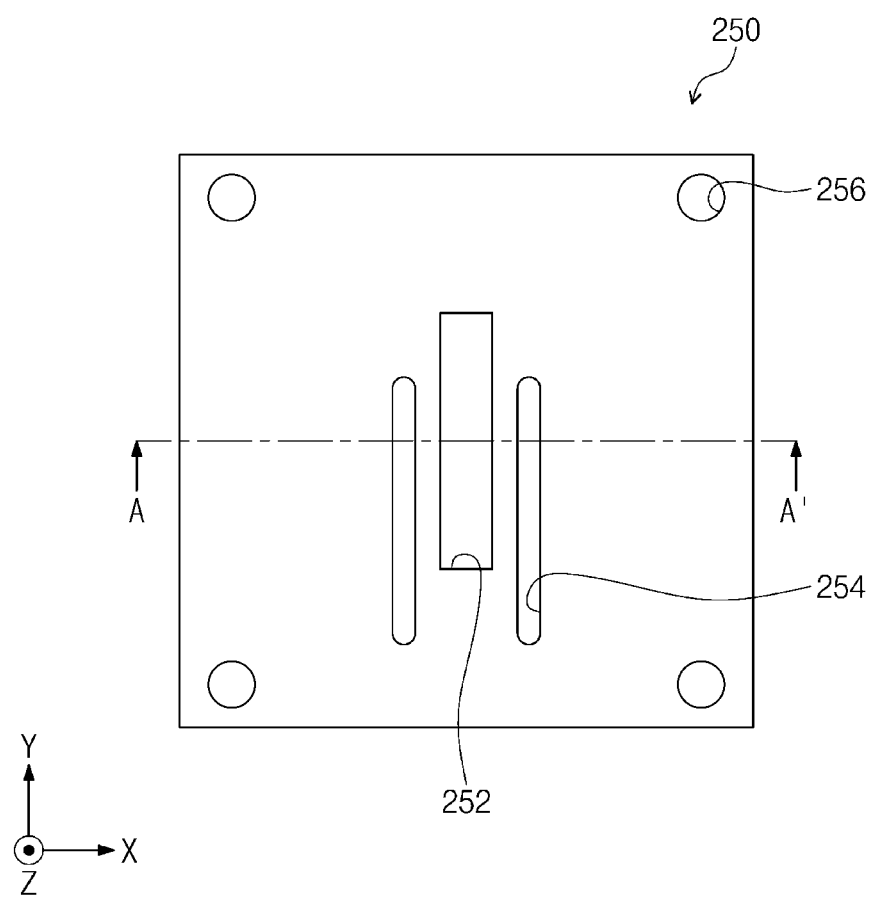
FIG. 6 is a plane view illustrating a top surface of the fixing plate of FIG. 1.
Figure 7:
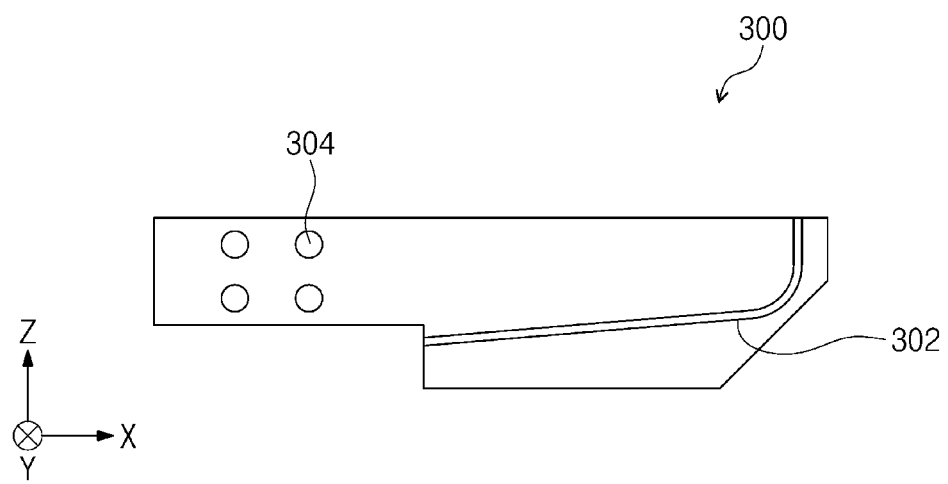
FIG. 7 is a cross-sectional view illustrating a jig of FIG. 1.

FIG. 1 is a cross-sectional view illustrating an optical alignment device according to an embodiment of the inventive concept. FIG. 2 is a cross-sectional view illustrating an optical detection element of FIG. 1. FIG. 3 is a perspective view illustrating an optical alignment plate of FIG. 1. FIG. 4 is a plan view illustrating a top surface of the optical alignment plate of FIG. 1. FIG. 5 is a perspective view illustrating a fixing plate of FIG. 1. FIG. 6 is a plane view illustrating a top surface of the fixing plate of FIG. 1. Specifically, FIG. 1 is a cross-sectional view taken along line A-A' of FIGS. 4 and 6. FIG. 7 is a cross-sectional view illustrating a jig of FIG. 1.

Referring to FIG. 1, an optical alignment device 1 may include an optical detection element 100, an optical alignment plate 200 disposed below the optical detection element 100, a fixing plate 250 disposed below the optical alignment plate 200, and a jig 300 disposed below the fixing plate 250.

In this specification, a first direction X is defined as one direction parallel to a top surface of the optical alignment plate 200, a second direction Y is defined as one direction parallel to the top surface of the optical alignment plate 200 and crossing the first direction X, and a third direction Z is defined as one direction perpendicular to the top surface of the optical alignment plate 200.

Referring to FIGS. 1 and 2, the optical detection element 100 may include a semiconductor substrate 104 having a first surface 104a and a second surface 104b, which face each other, a lens 102 disposed on the first surface 104a, and an optical sensor 106 disposed on the second surface 104b. The semiconductor substrate 104 may include a semiconductor material such as silicon (Si). The lens 102 may be provided on the first surface 104a of the semiconductor substrate 104 through a deposition method. The lens 102 may include the same material as the semiconductor substrate 104. The lens 102 may have a downward convex shape. The lens 102 may serve to collect an optical signal emitted to the lens 102 due to the convex shape. When the optical signal is emitted to the lens 102, the optical signal may reach the optical sensor 106 through the semiconductor substrate 104. When the optical signal reaches the optical sensor 106, a current may flow at the optical sensor 106. The optical sensor 106 may include a p-type semiconductor layer and an n-type semiconductor layer, which are vertically spaced apart from each other, with an i-type (intrinsic) semiconductor layer disposed therebetween.

A length of the semiconductor substrate 104 in the first direction X may be a first diameter D1. The length may be substantially the same as a maximum length of the optical detection element 100 in the first direction X. A length of the lens 102 in the first direction X may be a second diameter D1. The second diameter D2 may be less than the first diameter D1.

Referring to FIGS. 1, 3, and 4, the optical alignment plate 200 may have a first hole 202, a second hole 204, and a first alignment hole 206. The lens 102 may be exposed to the outside by the first hole 202. Due to this, the lens 102 may be observed from below the optical alignment plate 200. In terms of a plane, the first hole 202 may have a rectangular shape. However, the embodiment of the inventive concept is not limited thereto. For example, the first hole 202 may have any shape as long as the lens 102 of the optical detection element 100 may be observed. A length of the first hole 202 in the first direction X may be a third diameter D3. The first hole 202 may pass through the optical alignment plate 200.

The second hole 204 may be provided in plurality. For example, some of the second holes 204 may be disposed at one side of the first hole 202, and the rest of the second holes 204 may be disposed at the other side of the first hole 202 with the first hole 202 therebetween. That is, the second holes 204 may be spaced apart from each other with the first hole 202 therebetween. A distance between the two second holes 204, which are spaced apart from each other with the first hole 202 therebetween, in the first direction X may be a fourth diameter D4. The third diameter D3 may be less than the fourth diameter D4. The second holes 204 may pass through the optical alignment plate 200.

The first alignment hole 206 may be defined in each corner of the optical alignment plate 200. The optical alignment plate 200 may be fixed during the optical alignment by using a fixing unit such as a bolt at the first alignment hole 206.

Referring to FIGS. 1, 5, and 6, the fixing plate 250 may include a third hole 252, a recess 254, a fourth hole 255, and a second alignment hole 256.

The third hole 252 may vertically overlap the first hole 202 of the optical alignment plate 200. Lengths of the third hole 252 in the first direction X and the second direction Y may be greater than those of the first hole 202 in the first direction X and the second direction Y. Thus, when the third hole 252 is viewed from a bottom surface of the fixing plate 250, the lens 102 of the optical detection element 100 may be seen. However, the third hole 252 may not vertically overlap the second hole 204.

The recess 254 may vertically overlap the second hole 204 of the optical alignment plate 200. The recess 254 may not vertically overlap the first hole 202 of the optical alignment plate 200. The recess 254 may be provided in plurality. For example, some of the recesses 254 may be disposed at one side of the third hole 252, and the rest of the recesses 254 may be disposed at the other side of the third hole 252 with the third hole 252 therebetween. That is, the recesses 254 may be spaced apart from each other with the third hole 252 therebetween. The recesses 254 may not pass through the fixing plate 250 in the third direction Z. The recesses 254 may not be seen from the bottom surface of the fixing plate 250.

The fourth hole 255 may be defined in one side surface of the fixing plate 250. The fourth hole 255 may extend in the second direction Y and be connected with the recess 254.

The second alignment hole 256 may be defined in each corner of the fixing plate 250. The second alignment hole 256 may vertically overlap the first alignment hole 206. The optical alignment plate 200 may be fixed to the fixing plate 250 by using a fixing unit such as a bolt at the first alignment hole 206 and the second alignment hole 256.

Referring to FIGS. 1 and 7, the jig 300 may include an optical fiber insertion groove 302 and a fixing hole 304. An optical fiber 306 in FIG. 1 may be inserted to the optical fiber insertion groove 302. As the optical fiber 306 is inserted to the optical fiber insertion groove 302, one end of the optical fiber 306 may vertically extend toward the lens 102. However, this is merely an embodiment, and the embodiment of the inventive concept is not limited to the optical fiber insertion groove 302. For example, all sorts of methods of fixing the optical fiber 306 so that one end of the optical fiber 306 vertically extends toward the lens 102 may be used. The jig 300 may be connected with another fixing component (not shown) through the fixing hole 304. The jig 300 may be fixed so as not to move during optical alignment by using a fixing unit such as a bolt at the fixing hole 304.

Referring to FIGS. 1 and 4 again, the first diameter D1 of the optical detection element 100 may be greater than the fourth diameter D4 of the optical alignment plate 200. Thus, the optical detection element 100 may cover all of the first hole 202 and the second holes 204 of the optical alignment plate 200. Also, the second diameter D2 of the lens 102 may be less than the third diameter D3 of the first hole 202. Thus, the lens 102 of the optical detection element 100 may be exposed to the outside by the first hole 202 and the third hole 252. Through this, the lens 102 of the optical detection element 100 may be observed from below the fixing plate 250. The optical detection element 100 may be fixed to the optical alignment plate 200 by vacuum suction through the second holes 204, the recesses 254, and the fourth holes 255. The inside of each of the second holes 204, the recesses 254, and the fourth hole 255 may be turned into a vacuum state such that the first hole 202 and the second holes 204 of the optical alignment plate 200 are covered by the optical detection element 100, and then a vacuum suction unit (e.g., an external vacuum pump) is connected to the fourth holes 255 of the fixing plate 250. Through this, the optical detection element 100 may be fixed to the optical alignment plate 200.

The jig 300 may be disposed below the fixing plate 250. The optical fiber 306 may be inserted to the optical fiber insertion groove 302 of the jig 300. As the optical fiber 306 is inserted to the optical fiber insertion groove 302, one end of the optical fiber 306 may vertically extend toward the lens 102. Thus, optical operation characteristics of the optical detection element 100 may be directly observed on a wafer without attaching a separate optical detection device to the optical detection element 100.

Figure 8:
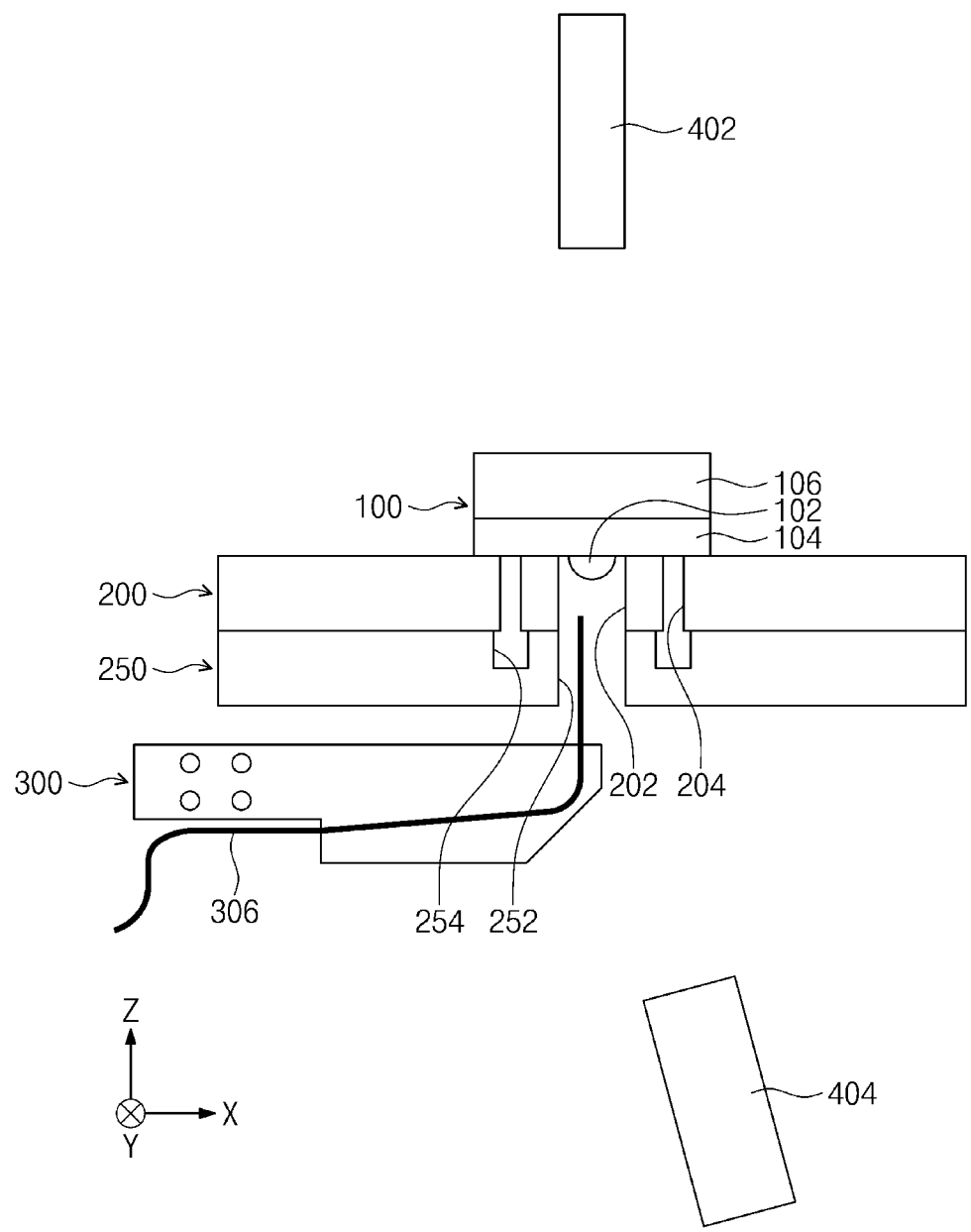
FIG. 8 is a cross-sectional view illustrating an optical alignment device according to some embodiments.

FIG. 8 is a cross-sectional view illustrating an optical alignment device according to some embodiments.

Since features in FIG. 8 overlap those described in FIGS. 1 and 7 except for features to be described below, redundant descriptions will be omitted. Referring to FIG. 8, an optical alignment device 1 according to some embodiments may further include a first microscope 402 and a second microscope 404. The first microscope 402 may be disposed above an optical sensor 106 of an optical detection element 100. A position of the optical detection element 100 may be adjusted through the first microscope 402. The second microscope 404 may be disposed below an optical alignment plate 200. The second microscope 404 may be disposed to directly observe a lens 102 from below the optical alignment plate 200. For example, the second microscope 404 may vertically overlap the lens 102. A position of an optical fiber 306 may be adjusted through the second microscope 404 so that one end of the optical fiber 306 vertically extends toward the lens 102.

Figure 9:
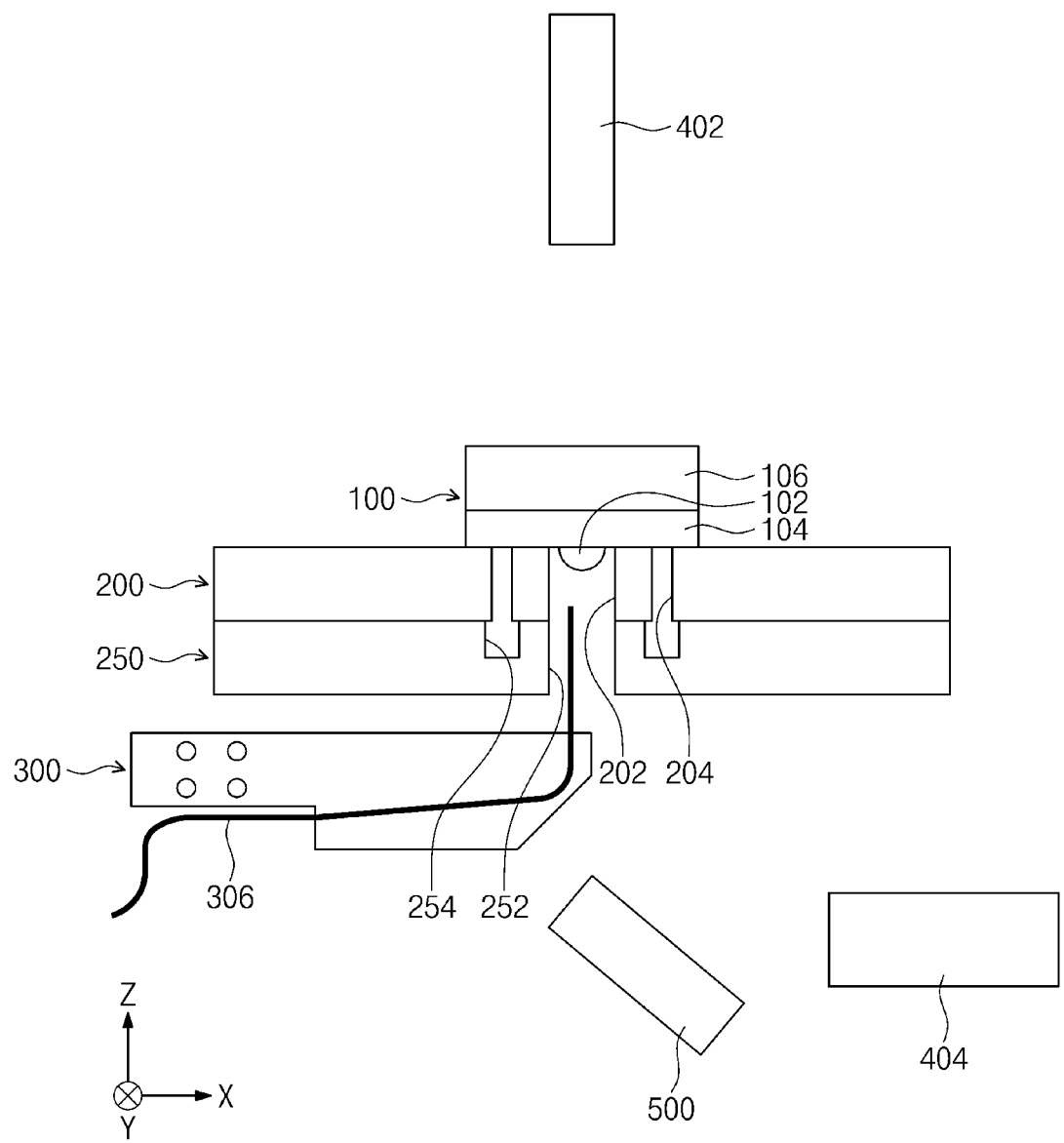
FIG. 9 is a cross-sectional view illustrating an optical alignment device according to some embodiments.

FIG. 9 is a cross-sectional view illustrating an optical alignment device according to some embodiments. Since features of FIG. 9 overlap those described in FIG. 6 except for features to be described below, redundant descriptions will be omitted.

Referring to FIG. 9, the optical alignment device 1 according to some embodiments may further include a reflection mirror 500. A position of the second microscope 404 may be adjusted by using the reflection mirror 500 when an optical alignment state between the optical fiber 306 and the lens 102 is observed through the second microscope 404. For example, the reflection mirror 500 may be disposed below the optical alignment plate 200 to vertically overlap the lens 102. The second microscope 404 may be disposed adjacent to a side surface of the reflection mirror 500. Through this, the optical alignment state may be checked through the reflection mirror 500 instead of directly observing the lens 102 through the second microscope 404. That is, a degree of freedom of the position of the second microscope 404 may increase.

According to the embodiment of the inventive concept, since the optical alignment between the optical detection element and the optical fiber may be performed without attaching the separate optical detector to the optical detection element, total inspection may be quickly performed on the wafer, and productivity may improve.

Although the embodiments of the present invention have been described, it is understood that the present invention should not be limited to these embodiments but various changes and modifications can be made by one ordinary skilled in the art within the spirit and scope of the present invention as hereinafter claimed.

What is claimed is:

1. An optical alignment device comprising:
    an optical alignment plate having a first hole and at least one second hole, wherein the first hole and the second hole pass through the optical alignment plate; and
    an optical detection element disposed on the optical alignment plate,
    wherein the optical detection element comprises a semiconductor substrate having a first surface and a second surface, which face each other, a lens disposed on the first surface, and an optical sensor disposed on the second surface,
    wherein the optical detection element vertically overlaps the first hole and the second hole,
    wherein the lens is exposed to the outside by the first hole, and
    wherein the second hole is connected with a vacuum suction unit to fix the optical detection element to the optical alignment plate.

2. The optical alignment device of claim 1, wherein the first hole has a rectangular shape, and
    wherein the lens has a downward convex shape.

3. The optical alignment device of claim 1, wherein the optical sensor comprises a p-type semiconductor layer and an n-type semiconductor layer, which are vertically spaced apart from each other, with an i-type (intrinsic) semiconductor layer disposed therebetween.

4. The optical alignment device of claim 1, further comprising a jig disposed below the optical alignment plate and an optical fiber fixed to the jig,
    wherein one end of the optical fiber is disposed adjacent to the lens.

5. The optical alignment device of claim 4, wherein the jig has an optical fiber insertion groove, and
    as the optical fiber is inserted to the optical fiber insertion groove, the one end of the optical fiber vertically extends toward the lens.

6. The optical alignment device of claim 5, further comprising a first microscope disposed above the optical detection element and a second microscope disposed below the jig,
    wherein the second microscope vertically overlaps the lens.

7. The optical alignment device of claim 1, wherein the second hole is provided in plurality, some of the second holes are disposed at one side of the first hole, and the rest of the second holes are disposed at the other side of the first hole with the first hole therebetween.

8. The optical alignment device of claim 1, wherein the lens has a diameter less than that of the first hole.

9. An optical alignment device comprising:
    an optical detection element comprising a lens and an optical sensor disposed on the lens;
    an optical alignment plate disposed below the optical detection element and having a first hole;
    a jig disposed below the optical alignment plate and having an optical fiber insertion groove; and
    an optical fiber inserted to the optical fiber insertion groove,
    wherein the optical detection element covers the first hole,
    wherein the lens is exposed to the outside by the first hole,
    wherein the optical sensor comprises a p-type semiconductor layer and an n-type semiconductor layer, which are vertically spaced apart from each other, with an i-type (intrinsic) semiconductor layer disposed therebetween, and
    wherein one end of the optical fiber vertically extends toward the lens.

10. The optical alignment device of claim 9, wherein the optical alignment plate further has at least two second holes,
    wherein the two second holes are spaced apart from each other with the first hole therebetween, and
    wherein the optical detection element covers the second holes.

11. The optical alignment device of claim 10, wherein the second holes are connected with a vacuum suction unit to fix the optical detection element to the optical alignment plate.

12. The optical alignment device of claim 9, further comprising a first microscope disposed above the optical detection element to vertically overlap the optical detection element.

13. The optical alignment device of claim 12, further comprising:
    a reflection mirror disposed below the jig; and
    a second microscope disposed adjacent to a side surface of the reflection mirror.

14. An optical alignment device comprising:
    an optical alignment plate having a first hole and at least one second hole disposed around the first hole;
    an optical detection element disposed on the optical alignment plate, wherein the optical detection element comprises a lens and an optical sensor disposed on the lens,
    a jig disposed below the optical alignment plate and having an optical fiber insertion groove; and
    a microscope disposed below the jig,
    wherein the optical detection element covers all of the first hole and the second hole,
    wherein the lens is exposed to the outside by the first hole,
    wherein an optical fiber is inserted to the optical fiber insertion groove, so that one end of the optical fiber vertically overlaps the lens, and
    wherein the microscope observes an alignment state between the lens and the one end of the optical fiber.

* * * * *